June 23, 1931.  G. J. BANCROFT ET AL  1,811,343

LUBRICATING DEVICE

Filed May 21, 1928  2 Sheets-Sheet 1

Inventor
George J. Bancroft,
Martin E. Anderson.
By H. J. O'Brien
Attorney

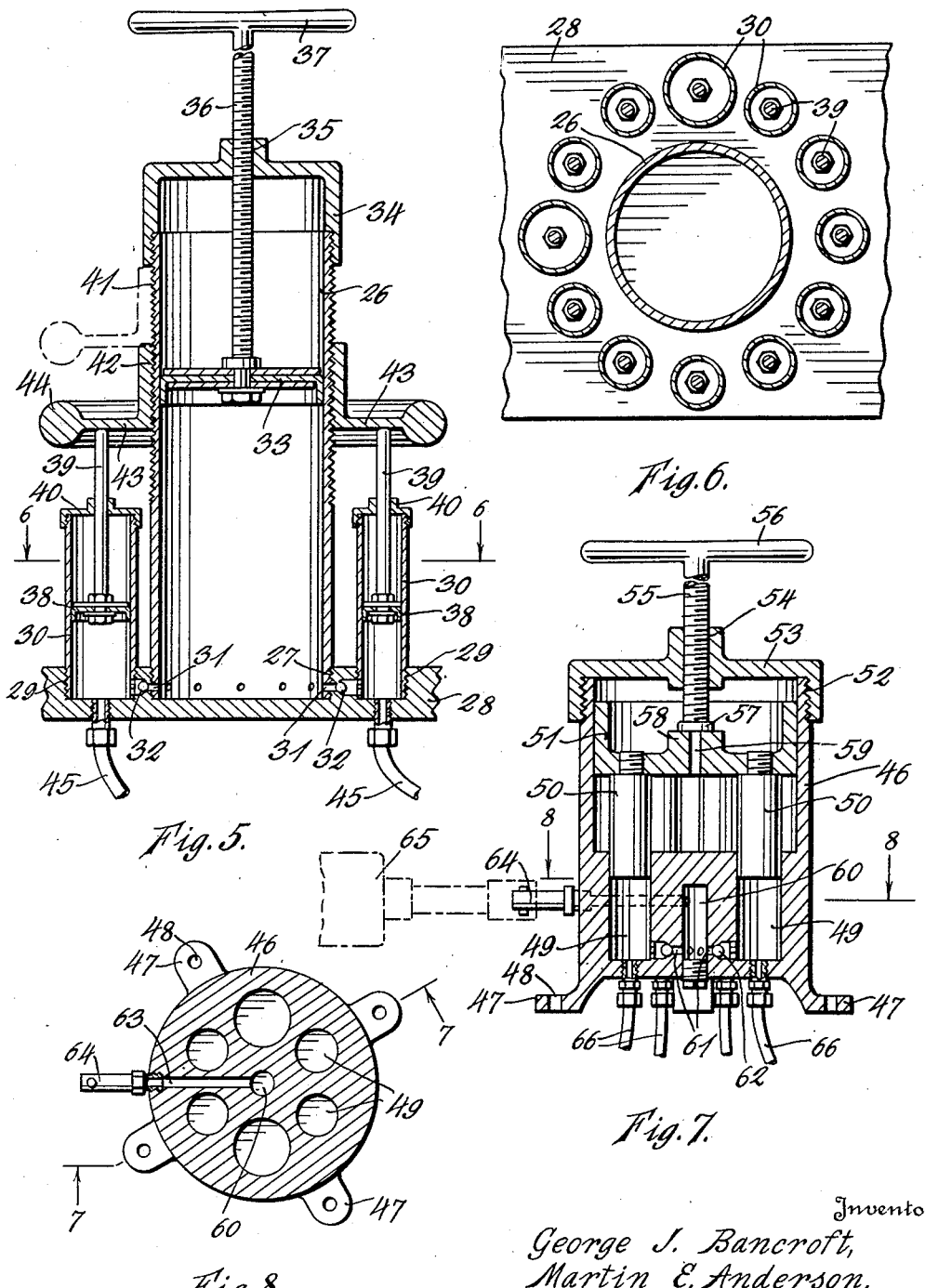

Patented June 23, 1931

1,811,343

UNITED STATES PATENT OFFICE

GEORGE J. BANCROFT AND MARTIN E. ANDERSON, OF DENVER, COLORADO

LUBRICATING DEVICE

Application filed May 21, 1928. Serial No. 279,454.

This invention relates to improvements in lubricating devices of the type employed for simultaneously lubricating a plurality of bearings.

Automobiles and other machines are provided with a large number of bearings which must be lubricated at frequent intervals and for this purpose it is customary to provide each separate bearing with a valved nipple through which a lubricant may be forced by means of a device which applies pressure to the lubricant. With devices of this type it is necessary to connect the pump or other pressure device to each bearing separately in order to obtain the desired results.

It is evident that the work of lubricating a machine having a large number of bearings would be greatly facilitated if it were possible to simultaneously lubricate all the bearings. The simultaneous lubrication of a large number of bearings is not such a simple matter as appears at first sight as on a cursory examination it seems that it would be only a matter of providing a large number of branches from the pressure device to the different bearings. The problem, however, is not as simple as this, for the reason that when a plurality of conduits are placed in parallel and each subjected to the same pressure conditions, if one pipe gets stopped up, no lubricant will flow to the bearing with which it is connected, while more than the usual amount will flow to the other bearings, with such devices therefore it is impossible to obtain uniform lubrications.

It is the object of this invention to produce a lubricating device or system of means of which it is possible to positively lubricate all of a large number of bearings simultaneously and to distribute the lubricant in the proper proportions to the several bearings, regardless of the different resistances offered at the different bearings or in the connections thereto.

This invention, briefly described, consists of a plurality of rigidly interconnected pumps or pressure devices which can only move in unison and which will therefore positively force lubricant through a large number of branches, for the reason that if one branch is stopped up, the device will be inoperative until this branch has been opened and practically all the force applied to the mechanism will be employed in opening the branch that is stopped up, thereby assuring positive lubrication of all the bearings connected with the device.

The above and other objects which may become apparent as this description proceeds are attained by means of a construction and arrangement of parts which will now be described in detail, reference for this purpose being had to the accompanying drawings in which the preferred embodiment thereof has been illustrated, and in which:

Figure 5 is a vertical section through a modified form of this device;

Figure 6 is a section taken on line 6—6, Fig. 5;

Figure 7 is a vertical diagrammatic section of a slightly modified form of construction; and Figure 8 is a section taken on line 8—8, Fig. 7.

Figure 1:
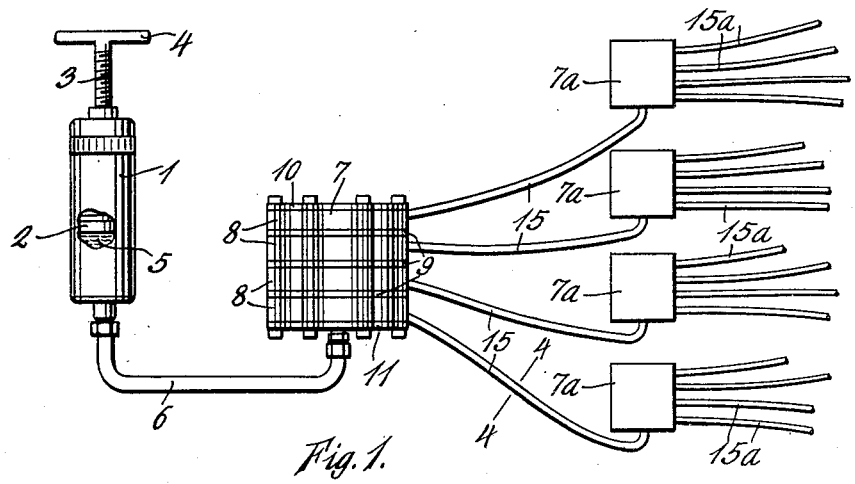
Figure 1 is a diagrammatic view showing the relationship of the several elements employed in this lubricating system.

In Fig. 1 numeral 1 represents a grease gun of the pressure type. This gun is of well known construction and is provided with a plunger 2 that can be moved longitudinally of the cylinder by means of a threaded rotatable rod 3 whose outer end is provided with a handle 4. When rod 3 is rotated the plunger 2 is forced inwardly, thereby applying pressure to the grease contained within the gun and which has been indicated by reference numeral 5. This pressure gun is connected by means of a metal conduit 6 to a distributor 7. This distributor has been illustrated in Figs. 2 and 3 and consists of a plurality of ring-like members 8 which are spaced from each other by means of separator plates 9 and which have attached to them end plates 10 and 11. Members 8 are of the shape shown in Fig. 3 and are each provided at each end with a cylindrical surface 12. These cylindrical surfaces are about one hundred eighty degrees in extent and are connected by either straight or arcuate surfaces 13. On one side of each of members 8 there is a threaded opening 14, to which the metal conduit 15 is connected in the manner shown in Figs. 2 and 3. The separator plates 9 are provided with openings through which the shafts 16 and 17 extend. The end plates 10 and 11 are provided with recesses or bearings 18 for the reception of the cylindrical ends 19 of shaft 17. Secured to the shaft 17 and located in the chambers between the separator plates 9 and the end plates 10 and 11 and between the separator plates are gears 20. There are two gears located within each of the chambers above referred to. These gears are identical in construction and are each provided with teeth 21. One gear in each chamber is secured to shaft 17 and the other gear in the same chamber is mounted on shaft 16. It will be observed from Fig. 3 that shaft 17 is not round, but is provided with flattened sides 22 and that the gears that are associated with this shaft have openings constructed in a similar manner so that the gears cannot rotate with respect to shaft 17. It is apparent therefore that all the gears connected with shaft 17 must rotate as a unit, or in other words, that they are rigidly interconnected. As the gears connected with shaft 17 are interconnected with those connected with shaft 16, the latter will rotate at the same speed as the gears on shaft 17.

Figure 3:
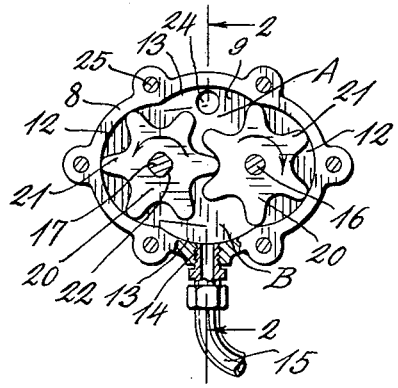
Figure 3 is a section taken on line 3—3, Fig. 2.

The conduit 6 is connected with an opening 23 in plate 11 and each of the separator plates 9 are provided with openings 24 so that each of the compartments in the ring-like members 8 are connected with the conduit 6. When the grease gun is operated to force lubricant through pipe 6, this grease will pass inwardly through the opening 23 and thence through openings 24, to each of the chambers. A gear pump of the type illustrated in Fig. 3 is well known. Due to its peculiar construction the gears will rotate in opposite directions in the manner indicated by the arrows in Fig. 3 whenever grease or other flowable material is introduced under pressure into the chamber A, which we may refer to as the intake chamber. The grease will therefore be carried by these gears to a chamber B which is the outlet chamber and will be forced from thence into and through the conduits 15 to other distributor units 7a similar to the one already described. From each of the distributor units 7a conduits 15a extend to different bearings, each conduit leading to a separate bearing. In the example given there are four distributor units 7a, each having four conduits 15a and therefore the capacity of this arrangement will be sixteen bearings, but it is evident that by increasing or decreasing the number of distributor units or by increasing the number of sets of rotary gear mechanisms in each, the capacity may be increased or decreased.

The end plates 10 and 11, ring-like members 8 and the separator plates 9 are held in assembled relation by means of bolts 25.

Attention is called to the fact that the distributor units 7 and 7a are constructed of interchangeable parts of identical construction and that they can therefore be made of any capacity as they can be built up to any extent desired. In the drawings the thickness of the ring-like members 8 have been shown equal, but it is evident that they can be of different thicknesses and that thereby the capacity of the gear pumps located within each of the rings can be varied so as to get a distribution of the grease to suit the requirements of the bearing to which the conduits are connected, thus, for example, it is evident that some bearings require more grease than others and such bearings should, therefore, be connected with the gear pump having the largest capacity.

Figure 4:
Figure 4 is a section taken on line 4—4, Fig. 1.

In Fig. 4 I have shown a cross section of one of the tubes 15 and from this it will be seen that these tubes have been formed of an elliptical cross section so that they will yield somewhat if subjected to excessive pressures. This yielding of the tubes acts as a reservoir and serves to make the device operate somewhat better than if the tubes were entirely round and therefore unyielding.

Let us now assume that the parts are assembled in the manner shown in Fig. 1 and that the operator rotates the threaded rod 3 by means of the handle 4 so as to move the plunger 2 downwardly. This applies pressure to the grease 5 which is thereby caused to flow through the conduit 6 into the intake chambers A of the several gear pumps comprising the unit 7. The grease which is thus forced into the intake chambers will produce a force that tends to rotate the gears in the direction shown by the arrows in Fig. 3. If all of the tubes 15 that extend from the outlet chambers B are open, grease will flow through these tubes in amounts proportional to the capacity of the different pumps to which they are connected. If the pumps are all of the same capacity as shown in the example illustrated, it is evident that the same quantity of grease will be extruded through each of the conduits 15 in equal lengths of time.

Let us now assume that one of the conduits 15 is stopped up or offers a much greater resistance to the flow of the grease than any of the others. As all of the gears 20 that are connected with shaft 17 must rotate at the same speed, it is evident that grease must be forced through all of the conduits or else there will be no grease flowing through any of them. All of the force exerted will therefore be used in opening up any stopped conduit as the device will not operate until all the conduits are open. Each of the conduits 15 corresponds to the conduit 6 and the operation of each of the distributing devices 7a is similar to the operation of the distributing device 7. It is, of course, obvious that the distributing device 7 should be of larger capacity than the distributing devices 7a, although this is not essential as the mechanism will operate even if the devices 7a are as large as the distributor 7.

From the above description it will be evident that if one of the tubes 15a that is connected to one of the bearings is stopped up that lubrication of any other bearing will be prevented until this particular bearing has been opened so as to permit lubricant to flow to it.

From the description above given, it will therefore be evident that with the mechanism described it is possible to simultaneously lubricate a large number of bearings and to be assured that every one of the different bearings obtains its proportional amount of lubricant. If the bearing should be stopped up so that lubricant cannot flow to it this will become immediately evident by the fact that the resistance offered to the flow of the grease will be excessive and if the application of a reasonable amount of force does not open the stopped up conduit, the operator must then determine which of the bearings is stopped up and this can be accomplished by observing the amount of distortion of the elliptical tubes for the reason that the tube that is stopped up will be subjected to a much greater pressure than the other tubes and as its shape is such that it will change in proportion to the pressure applied, the operator can quite readily discover the bearing that required cleaning.

The mechanism above described illustrates this invention quite clearly, but it is, of course, possible to employ mechanisms of specifically different constructions and in Figs. 5 and 6 a slightly modified form of device has been illustrated. In this device a cylinder 26 has its lower end threadedly connected at 27 to the inner walls of a recess formed in a base 28. A plurality of circular recesses 29 are formed in the base with their centers located on a circle concentric with the center of cylinder 26. Recesses 29 have their inner walls threaded and connected with each of these recesses is a cylinder 30. These cylinders have been shown of different diameters for the reason that it is often desirable to force different quantities of grease to different bearings as above intimated. The interior of the cylinder 26 is connected with the interior of each of the cylinders 30 by means of openings 31. The passage through each of openings 31 is controlled by means of a ball check valve which has been indicated by numeral 32. The ball of the check valve is prevented from entering the cylinders 30 as the latter is provided with small openings and act as stops for this ball. Located within the cylinder 26 is a plunger which has been indicated as a whole by numeral 33. Secured to the upper end of cylinder 26 is a cap 34 which has a central threaded opening 35 for the reception of a threaded rod 36 whose upper end is provided with a handle 37. It is evident that by rotating the rod 36 the plunger 33 can be moved upwardly or downwardly, depending on the direction of rotation. Located within each of the cylinders is a plunger 38. A rod 39 extends from the plunger outwardly through a central opening in cap 40. For the purpose of simultaneously moving the plungers 38, the outer surface of the cylinder 26 has been threaded as indicated by numeral 41. A hand wheel having a threaded hub 42 is operatively connected with the threaded surface of cylinder 26. This hand wheel has a flat flange 43 whose lower surface is adapted to come in contact with the upper ends of the rods 39. This hand wheel is provided with a grip portion 44 that can be grasped by the operator for the purpose of rotating it. As the hand wheel is rotated in such a direction that it moves downwardly along the cylinder 26, the plungers 38 will be moved downwardly within their cylinders in the manner quite apparent from the drawing. Connected with the interior of each cylinder 30 is a conduit 45 that extends to a bearing to be lubricated.

Let us now assume that the device shown in Figure 5 is assembled in the manner described and that the chamber within cylinder 26 below the plunger 33 is filled with lubricant. The hand wheel 44 is rotated so as to move it upwardly as far as it will go or to a position indicated by dotted lines. The operator now grasps the handle 37 and rotates the rod 36 in such a direction that the plunger 33 is forced to move downwardly. The pressure thus exerted forces grease to flow through the openings 31 into each of the cylinders 30 and this forces the plungers 38 upwardly until the upper ends of the rods 39 come in contact with the lower surface of flange 43. When the cylinders 30 have thus been filled with lubricant, the operator grasps the grip 44 of the hand wheel and rotates this so that it moves downwardly and this moves all of the plungers 38 downwardly at the same rate. If one of the conduits 45 are stopped up, or has a greater resistance than the others to the flow of lubricant, the parts can move downwardly only as fast as the plunger moves that corresponds to this conduit and therefore practically all of the force applied will be used to open up a stopped up conduit and after this has been accomplished, the grease will be distributed uniformly in predetermined proportions to the different bearings. The function of the check valve 35 is to prevent an equalization of the pressure between the different cylinders as this would prevent the stopped up pipe from being opened. It is only by using check valves that the device will positively function to open the conduit to a bearing that has become clogged.

In Figs. 7 and 8 a slightly modified form of construction has been shown. In this construction a cylinder 46 forms the body member of the device and this is provided with a plurality of lugs 47 that have openings 48 for the reception of bolts or screws by means of which the device can be secured to a suitable support. The bottom of cylinder 46 is quite thick and is provided with a plurality of cylinders 49 that may be of different diameters, but which are preferably located with their centers on a circle concentric with the cylindrical opening in member 46. Located within each of the cylinders 49 is a plunger 50. The upper ends of these plungers are connected to a guide or piston 51 so that they are rigidly interconnected and can only move as a unit. The upper end of cylinder 46 is threaded as indicated by numeral 52 and has secured to it a cap 53. This cap has a central threaded opening 54 for the reception of a threaded rod 55, whose upper end is provided with a handle 56. The lower end of this rod has a collar 57 that engages the upper end of the center hub 58 of the piston 51. Rod 55 may also be provided with a central cylindrical portion 59 that extends into an opening in the hub 58 in the manner shown. The bottom of the cylinder is provided with a central opening 60 which in turn is connected with each of the cylinders 49 by means of openings 61 within which are located balls 62 that serve as check valves and which prevent lubricant from flowing from the cylinder 49 into the central opening 60, but which permit lubricant to flow in the opposite direction. An opening 63 extends from the central opening 60 to the outside of the cylinder and to the outer end of this opening a nipple 64 is connected in the manner shown in Fig. 8. This nipple is of the type ordinarily employed in high pressure lubricating systems and by means of it the opening 60 can be connected with a grease gun 65 shown dotted in Fig. 7. The interior of each cylinder 49 is connected by means of a conduit 66 to a bearing.

Let us now assume that the plungers 50 and the pistons 51 to which they are attached are moved downwardly as far as they will go. In this position the lower ends of the plungers will be substantially in contact with the bottom of the cylinders 49. The grease gun 65 is now attached and by means of it grease under pressure is forced into the opening 60 and this will flow through opening 61 into the cylinders 49 and move the plungers 50 upwardly, thereby filling the cylinders 49 with grease. When the hub 58 of the piston 51 engages the lower end of rod 55, the grease gun can be disconnected and the operator then rotates the rod 59 by means of the handle 56 so as to force the plungers downwardly; as the plungers move downwardly the lubricant contained in the cylinders will, of course, be forced through the conduit 66 to the bearing with which the conduits are connected. It is evident that if any one of the conduits or bearings have become clogged that none of the plungers will move until this conduit has become opened and therefore substantially the entire force will be used in opening this clogged conduit or bearing. As the plungers move downwardly, the operator can be assured that each bearing is getting its proportional part of the lubrication.

Figure 2:
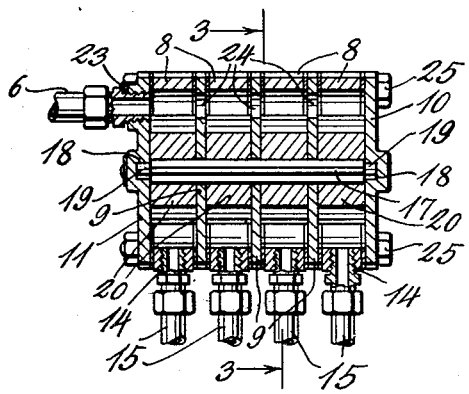
Figure 2 is a section taken on line 2—2, Fig. 3.

From the above description it will be apparent that by means of the device described, it is possible to simultaneously lubricate a large number of bearings and to deliver to each bearing an amount of lubricant that is suitable for that particular bearing. Devices of this kind can be employed for all different kinds of machinery, including automobiles, locomotives and printing presses, and every machine where it is necessary to lubricate a large number of bearings in the shortest time. A device of the kind illustrated in Figs. 1, 2 and 3, is especially well adapted for use in connection with flange lubricators for locomotives as by means of it the required amount of lubrication can be delivered to each flange, regardless of the difference in temperature which would otherwise operate to modify the distribution of lubricant in such devices.

In the above description three specifically different forms of this device have been illustrated and these are merely examples of devices of this type. It is therefore the intention of the applicants to claim this device broadly as it is evident that specifically different modifications may readily be devised for accomplishing the function desired.

It is obvious that instead of using a threaded member like 3, 36 and 55 for applying force to the lubricant that compressed air or steam can be employed.

In the above description attention has been directed to the noncircular resilient conduits employed between the pressure device and the bearings. In addition to the advantages pointed out above, such conduits serve as resilient reservoirs that will yield when a bearing is clogged and thereby provide a supply of lubricant that will be subjected to a pressure which will cause it to feed into the bearing when the obstruction is removed as it usually will be when the parts are in motion.

In this manner even if a bearing does not receive its lubricant at the time at which the device is operated it will have the lubricant delivered to it gradually due to this constant pressure.

Having described the invention what is claimed as new is:

1. A lubricating system including a main conduit and a plurality of resilient noncircular branch conduits, means for producing a flow of lubricant through the main conduit and the branch conduits and means at the juncture of the main conduit and the branch conduits and operable solely by the pressure of the entering lubricant for distributing the flow of lubricant in the branch conduits in a predetermined ratio for establishing a positive flow through each of the several branch conduits in accordance with the proportion of distribution allotted for each of the branch conduits.

2. Means for simultaneously lubricating a plurality of bearings, comprising a lubricant container, means for forcing the lubricant therefrom, a distributor containing a plurality of distinct but intercommunicating compartments, conduits leading respectively from the said compartments to the bearings to be lubricated, a single conduit leading from the said container to the said distributer for simultaneously delivering lubricant to the several compartments and means in each compartment operable by the pressure of the entering lubricant, for simultaneously ejecting the same into the several conduits leading to the bearings to be lubricated.

3. Means for simultaneously lubricating a plurality of bearings, comprising a lubricant container, means for forcing the lubricant therefrom, a distributer containing a plurality of distinct but intercommunicating compartments, conduits leading respectively from the said compartments to the bearings to be lubricated, a single conduit leading from the said container to the said distributer for simultaneously delivering lubricant to the several compartments and means in each compartment operable by the pressure of the entering lubricant, for simultaneously ejecting the same into the several conduits leading to the bearing to be lubricated, the ejecting elements of all the compartments of the said distributer being connected to operate in unison.

4. Means for simultaneously lubricating a plurality of bearings, comprising, a lubricant container, means for forcing the lubricant therefrom, a plurality of bearings, a distributer located between the lubricant container and the bearings, the distributer having a plurality of interconnected gear pumps each having an intake and a delivery port, a separate conduit extending from the delivery port of each pump to a bearing, a conduit extending from the lubricant container to the intake ports of the several pumps, and means for preventing the return of lubricant to the container.

5. In a device for lubricating bearings, in combination, a lubricant container, means for forcing lubricant therefrom, a conduit extending from the container to the bearing, said conduit having flattened sides whereby the capacity per unit length of the conduit will be varied in accordance with the pressure, and means for preventing lubricant from returning to the lubricant container.

6. A lubricating system including a main conduit and a plurality of branch conduits, means for producing a flow of lubricant through the main conduit and the branch conduits and interconnected mechanical means at the juncture of the main conduit and the branch conduits and operable solely by the pressure of the entering lubricant for distributing the flow of in the branch conduits in a predetermined ratio and for establishing a simultaneous positive flow through all of the several branch conduits in accordance with the distribution allotted for each of the branch conduits.

In testimony whereof we affix our signatures.

GEORGE J. BANCROFT.
MARTIN E. ANDERSON.